United States Patent [19]
Deakin

[11] Patent Number: 5,167,218
[45] Date of Patent: Dec. 1, 1992

[54] SOLAR COLLECTOR HAVING ABSORBER PLATE FORMED BY SPRAYING MOLTEN METAL

[76] Inventor: David Deakin, 19608 Enterprise Way, Gaithersburg, Md. 20879

[21] Appl. No.: 483,626

[22] Filed: Feb. 23, 1990

Related U.S. Application Data

[60] Division of Ser. No. 250,722, Sep. 29, 1988, Pat. No. 4,911,353, which is a continuation of Ser. No. 87,201, Aug. 20, 1987, abandoned, which is a continuation of Ser. No. 846,091, Mar. 31, 1986, abandoned.

[51] Int. Cl.⁵ .................................................. F24J 2/00
[52] U.S. Cl. .................................... 126/569; 126/661; 126/663; 126/908; 126/654
[58] Field of Search ............... 126/417, 446, 443

[56] References Cited

U.S. PATENT DOCUMENTS

| | | | |
|---|---|---|---|
| 966,070 | 8/1910 | Bailey | 126/446 |
| 3,129,703 | 4/1964 | Tabor | 126/446 |
| 4,072,262 | 2/1978 | Godrick et al. | 228/265 |
| 4,074,406 | 2/1978 | Boyd et al. | 165/168 X |
| 4,264,641 | 4/1981 | Mahoney et al. | 427/422 |
| 4,534,336 | 8/1985 | Ladriere | 126/446 |
| 4,579,107 | 4/1986 | Deakin | 126/443 |

*Primary Examiner*—Larry Jones
*Attorney, Agent, or Firm*—Cushman, Darby & Cushman

[57] ABSTRACT

A solar energy collector whereby an absorber plate thereof is formed by providing a thin metallic foil for supporting sprayed molten metal, arranging fluid carrying tubes on the foil, and spraying molten metal using a source of pressurized inert gas onto a substrate and tubes to build up a coating of sufficient thickness to form a unified solar collector panel comprising the absorber plate, embedded tube and foil which have good thermal contact with each other. The method further includes forming a selective surface on the sprayed metal absorber plate.

17 Claims, 3 Drawing Sheets

SOLAR COLLECTOR HAVING ABSORBER PLATE FORMED BY SPRAYING MOLTEN METAL

CROSS-REFERENCE TO RELATED PATENTS AND PATENT APPLICATIONS

This is a divisional of allowed U.S. patent application Ser. No. 07/250,722 filed Sep. 29, 1988 now U.S. Pat. No. 4,911,353 (incorporated herein) which is a continuation of Ser. No. 87,201 filed Aug. 20, 1987, now abandoned, which is a continuation of Ser. No. 846,091 filed Mar. 31, 1986, also abandoned.

BACKGROUND OF THE INVENTION

The present invention relates to solar collectors and methods of producing the same.

A typical solar collector absorbs radiant energy by way of an absorber plate to which tubes are mechanically attached or adhesively bonded. A working fluid in the tube transfers useful heat energy from the absorber plate. To attain high efficiency, one strives to achieve good thermal contact between the absorber plate and the tubes. As known in the art, the manner of connecting the tubes to the absorber plate affects heat collecting and transfer efficiency of the solar collector. U.S. patents to Boyd (U.S. Pat. No. 4,074,406), Andrassy (U.S. Pat. No. 4,089,326) Heinman (U.S. Pat. No. 4,245,620), Beckman (U.S. Pat. No. 4,369,836) and Grahman (U.S. Pat. No. 4,517,721) show typical absorber plates with tubes mechanically fastened or cemented into place. Use of dissimilar metals, such as copper tubes and aluminum plates, limits joining and connecting techniques and thereby presents some difficulties in the collector fabrication process.

The present invention improves heat collecting and transfer efficiency regardless of tube configuration, and enables formation of an absorber plate and tube connection with greater thermal contact despite use of dissimilar metals or materials. The invention also obviates the need to use manifolds to connect respective tubes, unlike the welding and mechanical compression techniques used in prior art systems. In addition, an absorber plate having varying thicknesses throughout its surface may conveniently be fabricated.

Solar collectors traditionally include a selective surface to increase absorption efficiency. A common high efficiency selective surface employs electro-plated black nickel or chrome. The process of forming a selective surface involves intricate surface preparation including cleaning, chemical treatment, etching, and electroplating. The present invention, if desired, enables application of a selective surface by conventional techniques, or alternatively, by using metallic foils having a surface which is pre-treated as a selective surface.

SUMMARY OF THE INVENTION

An absorber plate of a solar collector is formed by depositing sprayed molten metal on a substrate which includes heat transfer tubes until building up a sufficient thickness of solidified metal about the tubes whereby a unitary structure is formed including a collecting surface, the transfer tubes, and an absorber plate formed by the sprayed metal. The sprayed metal absorber plate may be separated from the substrate after solidification, or alternatively, may include a thin sheet of metallic foil placed over the substrate before spraying and solidification. The method preferably includes providing a selective surface on the absorber plate. Spraying preferably is achieved by depositing molten metallic particles sprayed in a vacuum chamber or by a pressurized inert gas in an inert atmosphere.

These and other objects, features and advantages of the present invention will become more apparent from the following description when taken in connection with the accompanying drawings.

DETAILED DESCRIPTION OF THE PREFERRED EMBODIMENTS

Figure 1:
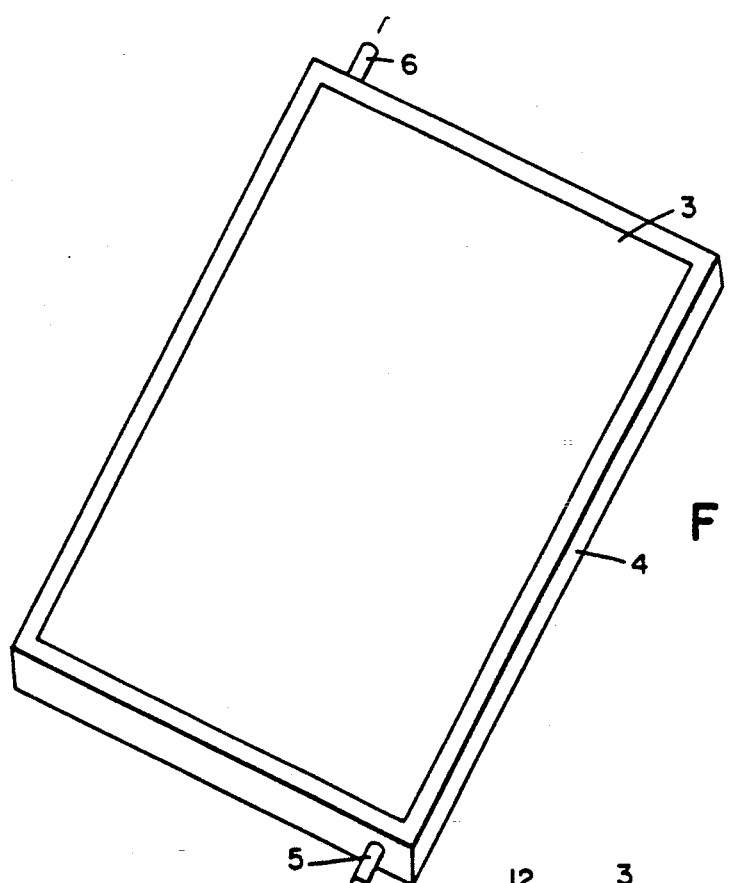
FIG. 1 shows a sprayed metal solar collector according to the present invention.
Figure 2:
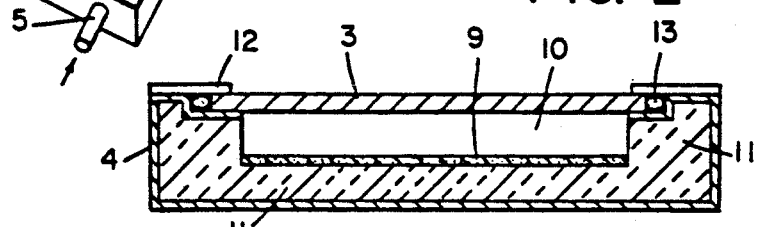
FIG. 2 is a cross-sectional view of FIG. 1 depicting elements of the collector housing.

Referring now to the drawings wherein like reference numerals are used to designate like parts and more particularly to FIG. 1, it is seen that a flat-plate collector comprises transparent glazing 3, collector frame 4, inlet port 5, and exit port 6. Solar radiation striking the collector passes through transparent glazing 3 and is absorbed by an absorber plate disposed beneath said glazing (FIG. 2). As the absorber plate heats up, a heat transfer medium, such as a gas or fluid, is introduced in the inlet port 5, and is brought into contact with said absorber plate 9, absorbing the available thermal energy and exiting through exit port 6 to be used or stored. In this manner, solar energy is transferred to the working heat transfer medium. Means are provided to insulate the absorber plate for maximum efficiency, by air or gas space 10 (FIG. 2) disposed above the absorber plate, and by an insulating material 11 (FIG. 2) on the edges and underneath said absorber plate.

Absorber plate 9 is formed by depositing sprayed molten metal on a substrate which includes heat transfer tubes until building up a sufficient thickness of solidified metal about the tubes whereby a unitary structure is formed including a collecting surface, heat transfer tubes, and an absorber plate formed by the sprayed metal. Adhesion of the molten metal during spraying improves upon preheating the substrate. Cooling is allowed between layers to build up successive layers for thick deposits. When unconcerned with substrate damage due to overheating, the sprayed metallic absorber may be heated during or after spraying to a point where the sprayed metal particles are molten and flow together creating a more homogeneous material and consequently increasing the thermal conductivity. Spraying is preferably performed in a vacuum or inert atmosphere to reduce oxide formation. Such oxides lower thermal conductivity and impede the flow of the molten material.

Spraying may be accomplished by a pressure differential between the sprayed source of molten metal and a chamber encasing the absorber plate. In some cases, an evacuated chamber has a negative pressure relative to the source of molten metal which may be at atmospheric pressure. The net pressure differential causes molten metal to flow into the evacuated substrate chamber. In this case, molten metal is directed through an orifice or atomizing device to induce a spray. Sometimes, it becomes necessary to increase the pressure differential by creating a positive pressure in the molten metal reservoir in order to induce a more rapid flow or final spray. Additionally, metal may be sprayed or deposited as a powder, flake, chip or similar size and shaped particles, and fused together by melting.

After the powder, flake or chip has been deposited, it may be mechanically compressed before subsequent heating and melting. A binder or carrier agent may be used to hold together the deposited material which is then burned off during the heating and melting phase. To improve the adhesion of the melted metal to the absorber tubes, it may be desirable to first coat the tubes with a layer of sprayed metal. This may be of the same metal as the metal used to form the absorber plate. An alloy may alternatively be employed.

Alternatively, the powder, chip or flake may be sprayed onto a heated substrate to effect melting on contact and solidification thereafter.

The absorber plate may be formed as separate element distinct from the remaining parts of the collector unit. When the choice of metal, metal thickness, geometric configuration or other parameter produces a sprayed absorber plate having insufficient structural integrity without a substrate, the substrate on which metal is sprayed remains part of the assembled structure. The preferred embodiment of the present invention uses, but is not limited to, foils or wire mesh as a substrate material. When the sprayed absorber plate does have sufficient structural integrity, it may separated form the substrate to be placed as a distinct component within the collector housing. Alternatively, a reinforcing structure may be attached to the absorber plate by conventional means after the spraying step.

By way of example, an absorber plate according to a preferred process is manufactured as follows. A thin aluminum foil having a thickness of approximately one mil is placed over a substrate. Aluminum or copper tubing is laid in the required pattern on the foil to provide a heat exchanger for the absorber plate. The substrate may include grooves to which the foil conforms and for receiving the tubing. The substrate can be heated prior to the spraying operation, if desired. After the entire assembly is laid in position, molten metal, such as aluminum, is then sprayed onto the tubing and the foil in order to build up a desired thickness of sprayed solidified molten metal across the foil which preferably embeds the tubing within. The resulting component, e.g., sprayed metal, foil and tubing, is then mounted as a single unit within a collector housing. It is evident that other variations of this process can be practiced.

As mentioned previously, the sprayed molten metal particles adhere best to irregularities in the surface of the substrate. In order to improve adhesion, the substrate surface is roughened by grit or sand blasting, such as with aluminum oxide. Soft substrate surfaces may be coated and then roughened to improve adhesion of the sprayed molten metal. The substrate surface may also be coated with another metal, such as zinc, to improve adhesion of the sprayed metal.

Some examples of said coating would be adhesives or coatings of just about any kind, including, but not limited to, epoxy and polyester resins. The preferred embodiment uses a sodium silicate base or derivative because of its superior sealing qualities, longevity, wide temperature range, and low cost. It may be necessary to add a powder or other grit-type material to the coating to give the surface a textured or rough finish enhancing the adhesion of the sprayed molten metal. For best results, the powder or grit should be applied to the said coating while it is still in an uncured, semi-cured, or semi-liquid state. The preferred embodiment uses, but is not limited to, aluminum oxide as the grit to improve the adhesion of the sprayed molten metal. Adhesion of the sprayed molten metal may be improved sometimes by spraying the molten metal while said underlying coating is still uncured or semi-viscous, i.e., not hard or dry.

Because the sprayed molten metal is sometimes carried by a pressurized stream of air or gas, its deposition characteristics are subject to the nature in which the stream of air or gas strikes the surface of the substrate. Inert gas may also be used as a source of pressurized gas. It is sometimes advantageous to change the geometry of the surface to be coated so that the sprayed molten metal is deposited where and in a manner that is desirable. An example where this is often applicable is where two or more objects or surfaces are to be joined or embedded with molten metal, such as, for example, to attach a round tube to a flat surface. Because it is difficult to direct the molten metal spray to the underside of the tube, it is often desirable to make a groove in the substrate to receive all or part of the tube. In some instances there may be a gap created between the edge of the groove and the edge of the tube, where the molten metal spray may be reluctant to fill in or bridge the gap. It is therefore necessary to fill the gap with a material that will ensure a smooth transition from the substrate to the tube. The preferred embodiment uses, but is not limited to, a sodium silicate base or derivative with aluminum oxide on the exposed surface.

FIG. 2 illustrates a cross-sectional view of a version of FIG. 1, where the absorber plate 9 is formed by spraying molten metal onto a substrate according to the process described previously. The absorber plate 9 may be formed by spraying substrate 11 with the desired molten metal and securing it within the collector body, or alternatively, spraying the desired molten metal directly onto the insulating substrate 11 forming the absorber plate 9 directly thereon. Absorber 9 can be formed from, but is not limited to, copper and/or aluminum. Absorber plate 9 is insulated above from air space 10, said air space may be filled with an insulating gas. Additionally, absorber plate 9 is insulated on the bottom and sides by insulating material 11. Insulating material 11 may be a cellular or foamed insulation material. Solar collector housing 4 is shown which supports glazing 3 and houses the components of the collector. This member may be fabricated by existing techniques. Seal 13 is illustrated which seals transparent glazing 3 to collector frame 4 and may be constructed according to conventional practice. Clamp 12 holds the glazing securely within the collector.

Figure 3:
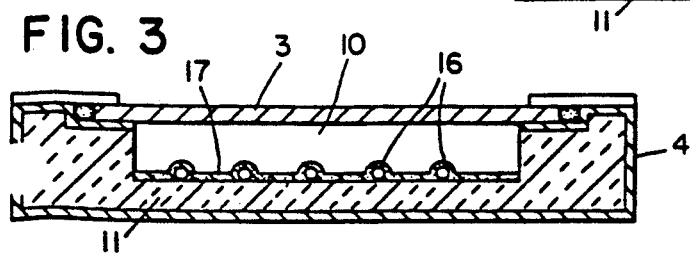
FIG. 3 is a cross-sectional view of FIG. 1 which depicts heat transfer tubes.

FIG. 3 is a cross-sectional view of yet another version of FIG. 1, similar to that in FIG. 2, except that absorber tubes 16 have been added to the absorber plate 17. The absorber plate 17 is formed in the same way as absorber 9 in FIG. 2, except that molten metal is sprayed over absorber tubes 16 and its substrate embedding them within absorber plate 17. The preferred embodiment uses copper tubes sprayed with aluminum. As discussed in the background of the invention, copper tubing is extremely difficult to attach to an aluminum absorber, soldering, brazing or welding according to conventional practice being just about impossible. However, this combination of metals is extremely desirable because of the corrosion resistance of the copper tubes to the heat transfer fluids, which usually have water as the major component, and because of the low cost of the aluminum for the absorber plate. The process described herein, of spraying molten metal to form the absorber plate works extremely well by embedding the copper tubing within the aluminum or attaching it thereto, with bond strengths of 8000 psi or higher easily attained. Because the copper absorber tube is wrapped in the aluminum absorber plate, the copper tubing is sealed off from environmental factors such as moisture and salt ions that might promote galvanic corrosion. In addition, no fluxes as with the conventional, soldering, brazing and welding processes, are needed, fluxes usually containing high concentrations of metal salts which promotes corrosion.

Figure 4:
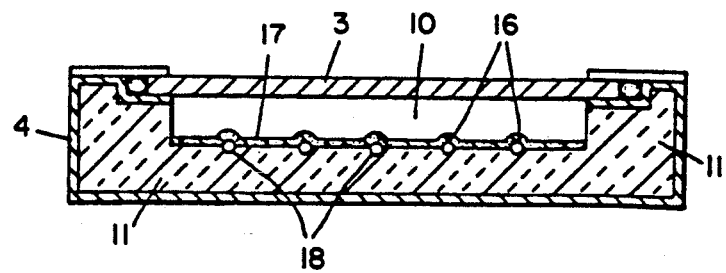
FIG. 4 is a cross-sectional view of FIG. 1 depicting an alternative arrangement of embedded heat transfer tubes.

FIG. 4 is a cross-sectional view of a variation of FIG. 1 and is very similar to FIG. 3, where the absorber tubes 16 are embedded in the absorber plate 17 by spraying molten metal 15 directly on substrate 11 and absorber tubes 16, resulting in a continuous absorber plate 17, where the absorber tubes 16 are an integral part of the absorber plate. Additionally, grooves 18 are formed in the substrate 11 to receive part of the absorber tubes 16.

Figure 5:
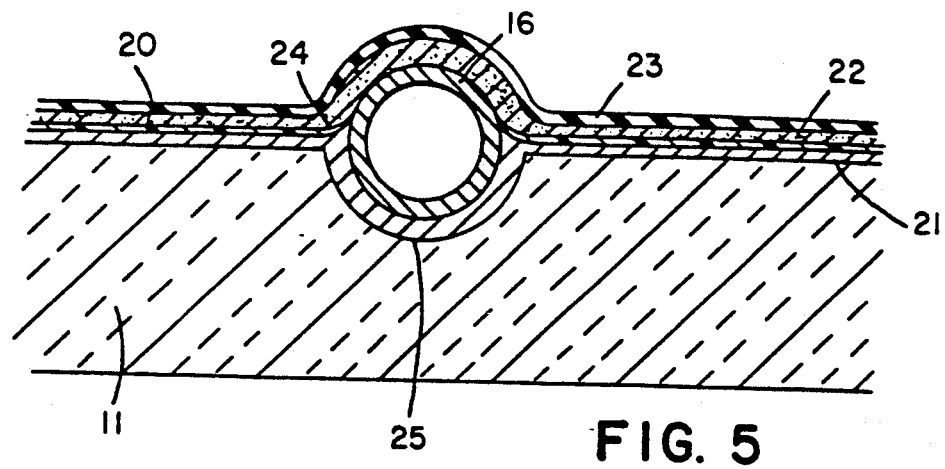
FIG. 5 is a partial expanded view of a cross-sectional view of an absorber plate and heat transfer tube depicting a selective surface.

FIG. 5 is an expanded cross-sectional view of a variation of an absorber plate such as that in FIG. 4, where the absorber plate 20 is formed directly on the insulation material 11 by spraying molten metal as described herein. Groove 25 is formed in insulating material 11 to receive all or part of absorber tubes 16. In order to improve adhesion of the sprayed metal absorber plate 20 to insulating material 11, an initial base coating 21 has been added to the surface of 11. To further improve adhesion of the sprayed metal absorber plate to insulating member 11, an additional layer or coating 23 of powder or grit has been added to the surface of base coat 21, as described previously. Base coatings 21 and 22 should bridge or close the gap at 24 created between the edge of groove 25 and absorber tube 16. This will assure that the sprayed metal absorber 20 will make a smooth transition to the absorber tube 16. This greatly enhances ease of manufacturing as described previously. The preferred embodiment uses a sodium silicate base or derivative for 21 with aluminum oxide added to the surface to form 22.

Figure 6:
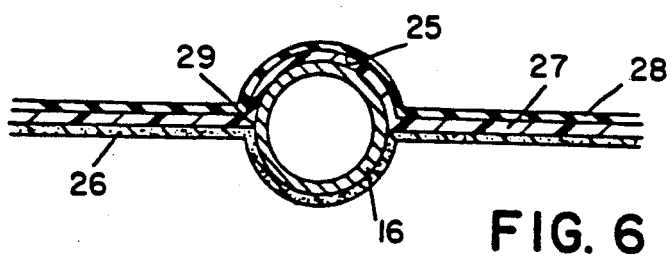
FIG. 6 is an alternative arrangement of the structure shown in FIG. 5.

FIG. 6 is an expanded cross-sectional view of an absorber plate formed according to the process of spraying molten metal described herein, utilizing a foil or metal sheet 27 as the substrate for sprayed metal coating 26. Foil or sheet 27 has grooves 35 formed therein to receive absorber tube 16. Sheet or foil 27 also is prepared, as previously mentioned, to improve adhesion of the sprayed molten metal layer to it. The preferred embodiment uses, but is not limited to, grit blasting as the said preparation method. Sprayed molten metal is applied preferably in thin multiple layers, building up coating 26 onto foil 27 and absorber tube 16 to the desired thickness forming a continuous uninterrupted absorber plate. Sprayed metal coating 26 may be concentrated on the joint 29 where the substrate sheet 25 or foil 27 meets absorber tube 16, coating 29 and the area to either side of 29 on 16 and 27 with sprayed molten metal, hence attaching said absorber tube 16 to substrate sheet 27.

Some methods may damage the substrate by excess heat developed during spraying molten metal. The present invention overcomes this problem by applying sprayed molten metal layer 26 in multiple thin layers and building up to the appropriate thickness, allowing any excess heat to dissipate after each layer. In this manner, the absorber tubes 16 can be efficiently attached to the substrate 27 without damaging the precoated surface 28.

Figure 7:
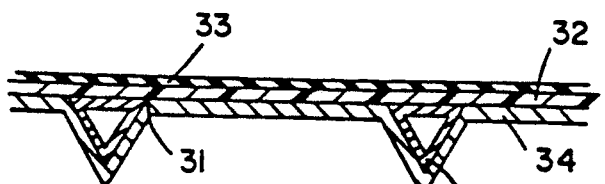
FIGS. 7 and 8 show examples of different geometrical tube shapes which may be used with the sprayed metal absorber plate according to the invention.

FIG. 7 shows an expanded cross-sectional view of an absorber plate similar to that described in FIG. 6. If it is not desirable to form grooves in the substrate to receive the absorber tubes, alternatively one can modify the shape of the tube 30 so that, when attached to a flat substrate plate 32 and sprayed with molten metal 34 according to the process described herein, the sprayed metal layer 34 makes a smooth transition from substrate 32 to absorber tube 30 in a triangular shape, however, the present invention is not limited to any particular size or shape. Also shown is surface 33 which may be a selective or non-selective surface coating, said coating may be on either side of the absorber plate which is comprised of elements 30,32, and 34 restricted only in that it be on that side of the absorber plate facing the sun.

Figure 8:
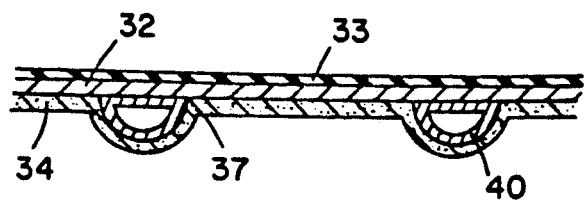

FIG. 8 is an expanded cross-sectional view of one variation of an absorber plate formed according to the process of spraying molten metal disclosed herein. As in FIG. 7, FIG. 8 shows a flat substrate 32 with no grooves to receive absorber tubes 40, hence tubes 40 have had their shape modified to facilitate the spraying of molten metal coating 34 to ensure that joints 37 are properly filled, securing said tubes 40 to said substrate 32. Coating 33 shows a selective or non-selective surface coating applied to the absorber plate, comprised of elements 32,34 and 40 restricted only in that it be on the side of the absorber facing the sun. FIG. 8 shows absorber tubes 40 in a half-round shape, said tubes not limited to any shape or size.

Figure 9:
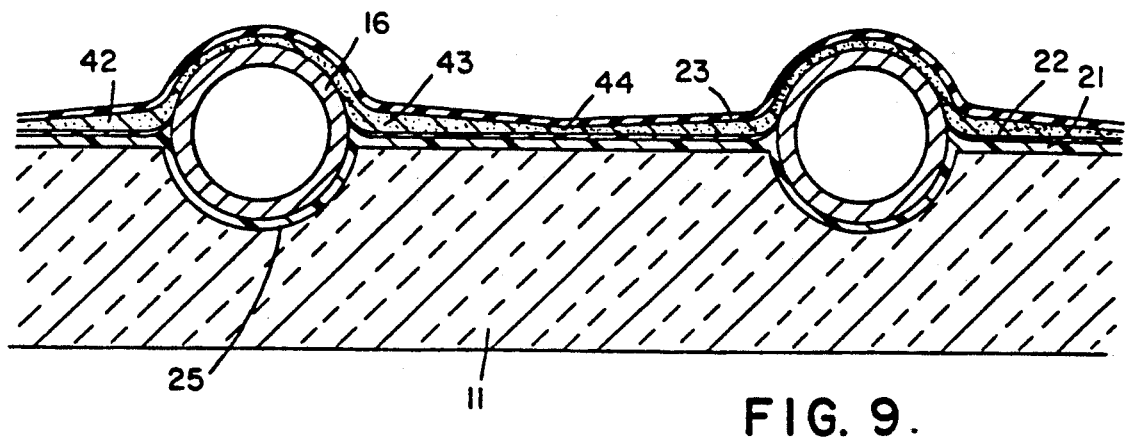
FIG. 9 shows varying of thicknesses in a sprayed metal absorber plate according to the invention.

FIG. 9 is an expanded cross-sectional view of an absorber plate 20 manufactured according to the process described herein of spraying molten metal. Molten metal is sprayed onto insulating substrate 11 with grooves 25 receiving tubes 16 to form absorber plate 42. Underlying base coats 21 and 22 may be used, as described in FIG. 5, to improve the adhesion of 42 to 11.

FIG. 9 is a variation of FIG. 5, in that the absorber plate 42 thickness is varied in order to increase the rate of heat flow from the absorber plate to the absorber tube. The molten metal spray can be controlled as it is deposited so as to precisely control the thickness of the absorber plate in predetermined areas for more efficient use of the metal and better thermal efficiency. The preferred embodiment shows absorber 42 thicker in the vicinity of the absorber tubes 16 and 5 tapering off to the midpoint between the tubes 44, where the thickness increases until it meets the adjacent absorber tube.

Figure 10:
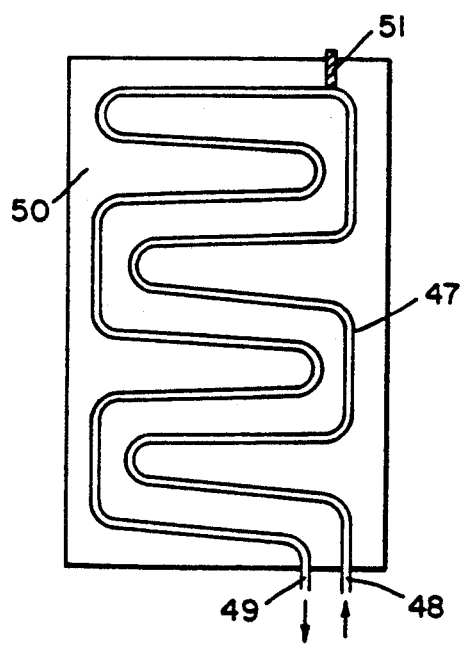
FIG. 10 shows a collector having a sinusoidal shaped heat transfer tube embedded in an absorber plate with hot and cold tubes arranged in a heat exchange relationship.

FIG. 10 shows an absorber plate 50 with the heat transfer tubing 47 embedded in or attached thereto, in a sinusoidal pattern. Inlet port 48 and exit port 49 are located next to each other with remaining, following tube sections run parallel or near parallel so that the hot and cold tubes are in a heat exchange relationship with each other, via the absorber plate 50. This has the effect of moderating hot sports on the absorber by keeping any one particular area from getting considerably hotter than the rest of the absorber, which would decrease efficiency because of increased conduction, convection and radiation from the hot spot. Additionally, the tubes may be arranged with a gentle slope so that the entire tubing configuration may drain by gravity. A vacuum breaker may be installed, if necessary for breaking a vacuum in the tube 47. Because the absorber plate 50 is formed from sprayed liquid metal, it can easily conform to almost any absorber tube arrangement.

Figure 11:
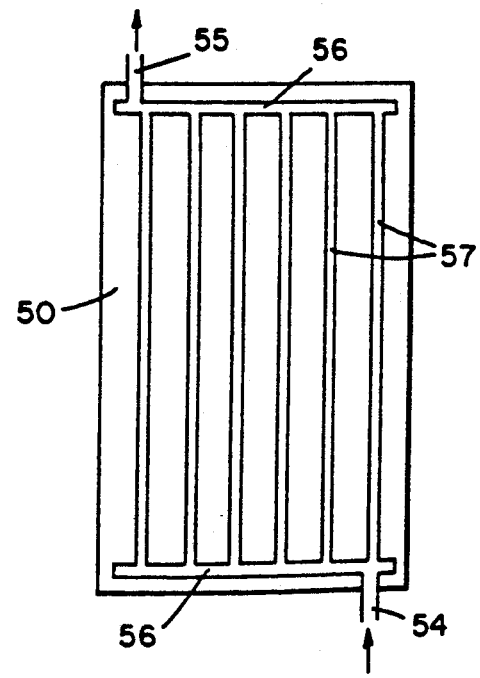
FIG. 11 shows a collector having heat transfer tubing embedded in an absorber plate in a manifold-type arrangement.

FIG. 11 shows absorbing tubing 57 in a more conventional arrangement, said tubes 57 running parallel to each other, connected at the ends by a pair of manifolds 56. This absorber tubing arrangement may be embedded, coated or attached to absorber plate 50 by spraying molten metal as previously described. Inlet port 54 and exit port 55 are provided to introduce and remove the heat transfer fluid. The tubing may be arranged so as to drain by gravity, if desired.

Accordingly, while I have shown and described plural embodiments in accordance with the present invention, it is understood that the same is not limited thereto, but is susceptible to numerous changes and modifications as known to one having ordinary skill in the art, and I, therefore, do not wish to be limited to the details shown and described herein, but intend to cover all such modifications as are encompassed by the scope of the appended claims.

What I claim to be secured by U.S. Letters Patent is:

1. A solar collector comprising tubular conduit means for carrying a heat exchange fluid, a support means disposed in close proximity to said tubular conduit means for providing support for sprayed metal particles, and sprayed metal absorber plate means formed by spraying molten metal over said tubular conduit means and said support means to build up a desired thickness of sprayed metal particles whereby to join said support means and said tubular conduit means in sufficient thermal contact.

2. A solar collector as recited in claim 1 wherein said support means includes a thin metallic foil.

3. A solar collector as recited in claim 1 wherein said tubular conduit means has a polygonic cross-sectional shape.

4. A solar collector as recited in claim 1 wherein said tubular conduit means has a half-round cross-sectional shape.

5. A solar collector as recited in claim 1 further including a sprayed metal absorber plate in which the spraying is performed in an inert atmosphere.

6. A solar collector as recited in claim 1 further including a sprayed metal absorber plate in which the spraying is performed in a vacuum chamber.

7. A solar collector as recited in claim 1 wherein, after the spraying step and solidification, said support means is separated from said solidified sprayed molten metal.

8. A solar collector comprising tubular conduit means for carrying a heat exchange fluid, a support means disposed in close proximity to said tubular conduit means for providing support for sprayed metal particles, and sprayed metal absorber plate means formed by spraying molten metal over said tubular conduit means and said support means to build up a desired thickness of sprayed metal particles for joining said support means and said tubular conduit means in sufficient thermal contact, said absorber plate means further being formed by heating said support means prior to or during said spraying thereby to effect fusion of the sprayed metal during spraying.

9. A solar collector as recited in claim 8 wherein said support means includes a thin metallic foil.

10. A solar collector as recited in claim 8 wherein the spraying is performed in an inert atmosphere.

11. A solar collector as recited in claim 8 wherein the spraying is performed in a vacuum chamber.

12. A solar collector as recited in claim 8 wherein, after the spraying step and solidification, said support means is separated from said solidified sprayed molten metal.

13. A solar collector comprising a tubular conduit means for carrying heat exchange fluid, a support means disposed in close proximity to said tubular chamber means for providing support for sprayed metal particle means, and absorber plate means being formed by depositing said metal particle means onto said support means and heating said support means to effect melting and subsequent fusion of said metal particle means so as to form a solidified structure comprising said absorber plate.

14. A solar collector as recited in claim 13 wherein said particle means comprises at least one of metallic flakes, metallic chips and metallic particles.

15. A solar collector comprising a tubular conduit means for carrying heat exchange fluid, a support means disposed in close proximity to said tubular chamber means for providing support for sprayed metal particle means, and absorber plate means being formed by depositing said metal particle means onto said support means and binding together said metal particle means so as to form a solidified structure comprising said absorber plate.

16. A solar collector as recited in claim 15 wherein said particle means comprises at least one of metallic flakes, metallic chips and metallic particles.

17. A solar collector as recited in claim 16 wherein said binding is performed by mixing a binding agent with said metallic particle means, and after forming said absorber plate, said binding agent is evaporated after said binding step.

* * * * *